Dec. 28, 1948.  R. A. SHIELDS  2,457,783
LATERAL SHIFTING CASTER TRUCK
Filed Dec. 10, 1943  4 Sheets-Sheet 2
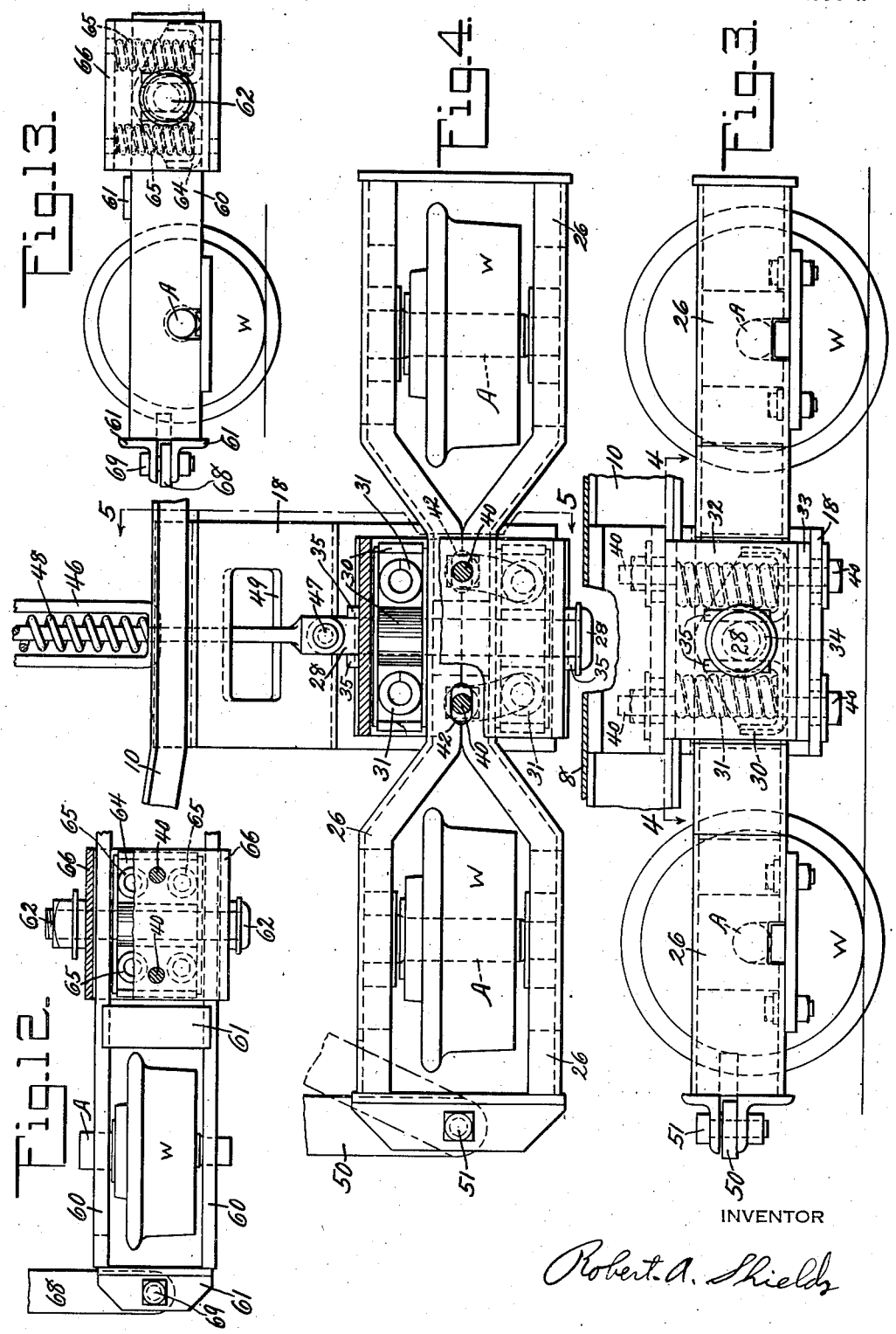
INVENTOR
Robert A. Shields

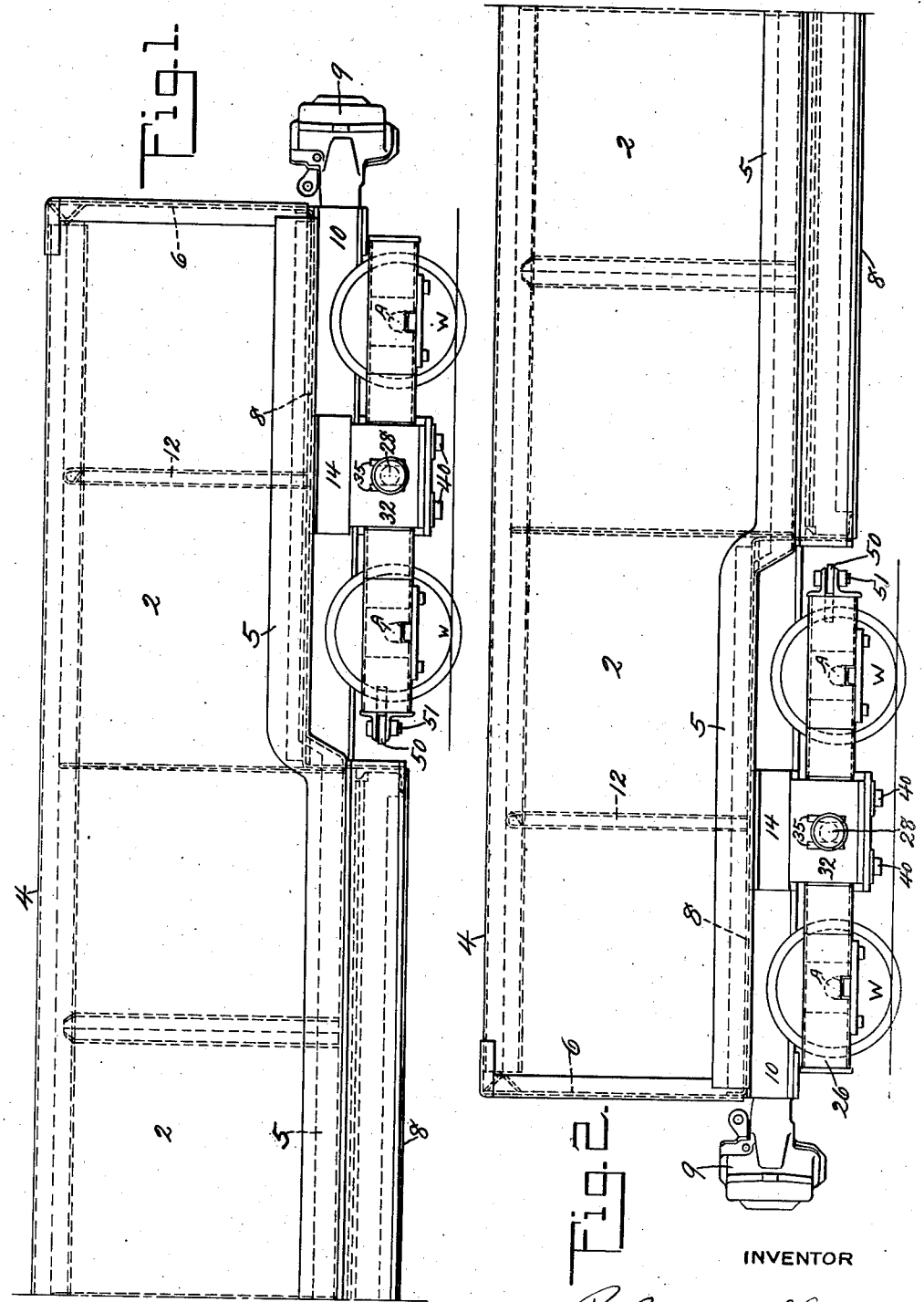

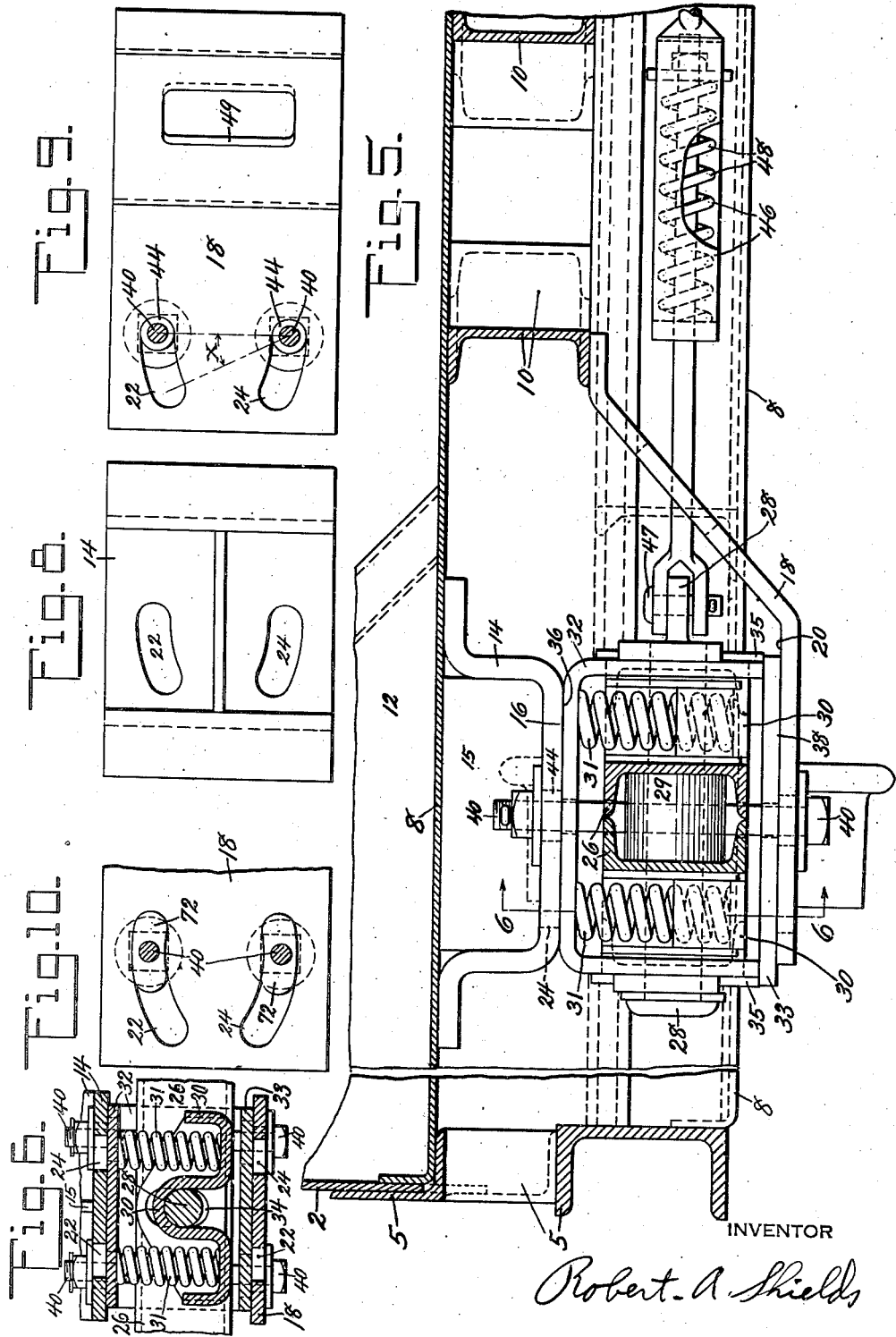

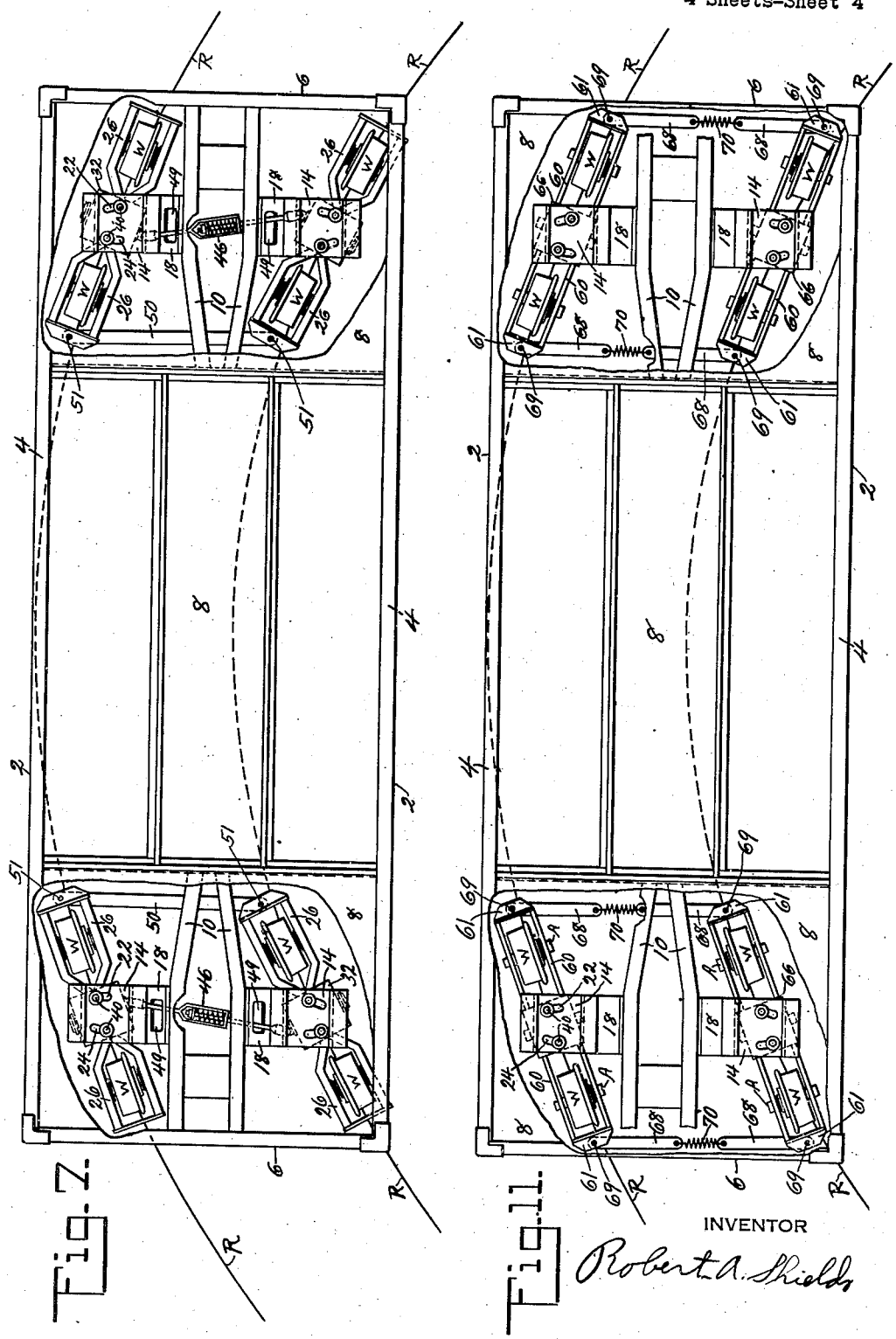

Patented Dec. 28, 1948

2,457,783

UNITED STATES PATENT OFFICE 2,457,783

LATERAL SHIFTING CASTER TRUCK

Robert A. Shields, Bloomsburg, Pa., assignor to American Car and Foundry Company, New York, N. Y., a corporation of New Jersey Application December 10, 1943, Serial No. 513,694

11 Claims. (Cl. 105—179)

This invention relates to caster trucks in general and in particular to such trucks for use with mine or other industrial cars which must operate on sharp curves.

When cars with the conventional caster truck are operated on extremely sharp curves derailments occur. Such derailments are due to the fact that the centers of turning for the truck are independent and are located on a line extending transversely of the body. This means that the transverse line on which the centers of turning are located is positioned at an acute angle to a radial line of the curve. In the other words, if the distance between the centers of turning is the same as the track gauge, then on a sharp curve the distance between the centers of turning is insufficient to permit the trucks to remain on the tracks. A further cause of derailments is due to the fact that where the trucks may swing about independent centers, the truck on the inner side of the curve must swing faster than the outer truck in order that the axles of each truck be maintained substantially perpendicular to the rail. With conventional caster trucks since the inner truck can not swing at a faster rate than the outer truck due to the tie bars, the wheels located adjacent the end of the car and on the inner side of the curve are forced off of the rail. It is an object, therefore, of the present invention to provide a caster truck having the parts so positioned and operating as to cause the inner truck to swing through a greater angle than the outer truck.

A further object of the invention is the provision of caster trucks which are positively forced outwardly to change the truck gauge in accordance with the degree of curvature of the tracks over which they operate.

A still further object of the invention is the provision of caster trucks having means to control the trucks at all times and shift them laterally with respect to the car body and in direct accordance with the degree of track curvature.

A yet further object of the invention is the provision of laterally shifting caster trucks having resilient self-centering means connected thereto.

Yet another object of the invention is the provision of laterally shifting caster trucks tied together by resilient tie bars for operation in unison while permitting lateral shift.

These and other objects of the invention will be apparent to persons skilled in the art from a study of the following description and accompanying drawings, in which:

Fig. 1 is an elevational view of the right end of the car, while

Fig. 2 is an elevational view of the left end of the car and taken together disclose the entire car;

Fig. 3 is an elevational view of the improved truck;

Fig. 4 is a sectional view of the truck taken substantially on line 4—4 of Fig. 3 but with parts broken away to better disclose the construction.

Fig. 5 is a sectional view taken substantially on line 5—5 of Fig. 4;

Fig. 6 is a sectional view taken substantially on line 6—6 of Fig. 5;

Fig. 7 is a plan view of the car with portions of the floor broken away to disclose the movement of the trucks and their relationship to the track when on a sharp curve;

Fig. 8 is a plan view of the top or body carried supporting plate;

Fig. 9 is a plan view of the body carried bottom supporting plate;

Fig. 10 is a plan view of one of the support plates but disclosing a slight modification;

Fig. 11 is a plan view similar to Fig. 7 but showing a modification;

Fig. 12 is a sectional view similar to Fig. 4 but disclosing the modification of Fig. 11, and Fig. 13 is a half elevational view of the modified truck.

Referring now to the drawings in detail, it will be seen that the caster trucks have been shown as applied to a comparatively large mine car of the rotary dump type. The car is primarily a side carrying car having side walls 2 stiffened by top and bottom chord members 4 and 5 respectively. The side walls are joined by end walls 6 and floor 8, the latter being located in two levels, one comparatively high level being over the trucks and the other low level being between the trucks. The car, as clearly shown, is provided with automatic couplers 9 carried beneath the high level end floor portions by what may be termed draft sills 10. The load is transferred by the various framing members supporting the floor to the side walls and thence through large gussets 12 located over the truck centers, thus acting in the same manner as do bolsters in large type cars. Located beneath the gussets 12 are generally U-shaped bearing members 14 which are welded or otherwise secured to the car floor and stiffened by means of a transverse rib 15. These bearing members may be termed slide plates and are formed with a flat lower surface 16 adapted to cooperate with and bear directly upon a portion of the truck later to be described. In order to help keep the truck in an upright position, a bracing member 18 is provided, this member being welded or otherwise secured to the draft sills 10 and extending laterally outward and downward to provide a flat guiding surface 20 located in spaced parallel relationship to the bearing surface 16. This brace member 18 may, if desired, also extend upward for connection to the bottom chord 5 of the car side wall, but in most cases such connection is not necessary. As clearly shown in the figures, particularly 8 and 9, the bearing plates 14 and guide plates 18 are provided with curved slots 22 and 24. These slots are exactly similar and are located in vertically aligned relationship, with the slot 22 arranged substantially concentric with the inner end of the slot 24, while slot 24 is likewise curved substantially concentric with the inner end of slot 22. The exact spacing and length of the slots is chosen in accordance with the service in which the car is to be used, with the degree of curve being the main controlling factor.

Each truck shown in Figs. 1 to 7 inclusive is formed of side frames 26 of channel cross section, with the flanges directed inwardly and deformed so as to permit of welding the flanges together adjacent the center of the truck. The side frames are supported upon wheels W by means of axles A. Intermediate the axles the side frames are pierced to receive a horizontal pivot pin 28 passing through the side frames and also through a bushing 29 located between the webs of the channel truck side frames. The pivot pins extend beyond the side frames and carry adjacent to the frames saddles 30. These saddles are swingably mounted on the pivot pins and provided with seats for the lower ends of springs 31, the upper ends of which bear against a box-like truck bearing member 32. This box-like truck bearing member is formed of an inverted U-shaped pressing, with the legs of the U connected by a bottom plate 33. The sides of the bearing member are vertically slotted as at 34 to permit vertical movement between the bearing structure and the pivot pins. In order to provide added bearing area and help relieve wear, small guide plates 35 may be welded or otherwise attached to the sides of the box-like bearing member adjacent the slots. This box-like truck bearing member is formed with a flat top surface 36 adapted to cooperate with surface 16 of the body bearing member and also with a bottom flat surface 38 adapted to cooperate with the bearing surface 20 of the guide and control bracket 18. The top and bottom members of the box-like truck bearing are pierced to receive vertically extending bolts 40. These bolts not only extend through the truck bearing member, but also through the slots of the bearing members carried by the car body. Likewise, they extend through elongated slots 42 cut in the flanges of the truck frame as clearly shown in Fig. 4 in order that the truck may oscillate about the pivot pin 28. Surrounding the bolts 40 and located in slots 22 and 24 are hardened bushings or rollers 44 (see particularly Fig. 9). In case bushings alone are used, they should be of slightly greater length than the thickness of body bearing members 14 and 18 in order that the bolts may be tightened without any danger of binding the structure.

The curvature of slots 22 and 24, assisted by the cooperation of the wheels on the rail, is sufficient to normally hold the trucks in proper position. However, in order to insure that the bolts 40 and bushings 44 are held against the inner ends of the slots when the car is on tangent track, a resilient means 46 is provided. This resilient means is pivotally connected by short pins 47 to the inner end of pivot pins 28. The springs 48 of the resilient tie are placed under a slight initial precompression and are so designed as to readily permit separation of the pivot pins 28. As shown, particularly in Figs. 4, 5 and 9, the resilient tie member extends through slots 49 cut in bracing structure 18 previously referred to. In order to tie the trucks together and cause unequal rates of swinging thereof, as will later be described, a single tie bar 50 is pivotally connected as at 51 to each truck, with the pivotal connection being located preferably on the gauge line of the truck. In assembling the trucks on the body, as will later be apparent, it is important that the tie bar 50, which is of rigid construction, be located toward the center of the car as is clearly shown in Figs. 1, 2 and 7.

Referring now to Figs. 11, 12 and 13 which disclose a modified truck construction, it will be seen that the truck frame is formed of flat bars 60 welded together at the ends and intermediate their ends by ties 61 and supported on the usual axles A and wheels W. These flat side frames are pierced to receive a horizontal pivot pin 62. This pivot pin intermediate the side frames carries a spring saddle structure 64 which in turn supports springs 65. These springs support a box-like truck bearing member 66 which may be identical in construction to that previously described in connection with Figs. 1 to 7 inclusive. This truck bearing structure 66 is pierced to receive the bolts 40 and will cooperate with the bearing members 14 and 18 exactly as previously referred to in the description of Figs. 1 to 7. In this form of truck the ends of the adjacent trucks are tied together by resilient tie bars 68 pivoted to the trucks by means, such as pins 69, located adjacent each end of the truck and preferably on the truck gauge line. These resilient tie members are provided with a spring 70 and may be of any desired design but are preferably formed as is the tension structure 46 shown in Figs. 4 and 5. These resilient tie members, like the centering structure 46, are constructed so that the springs exert a slight constant pressure tending to hold the trucks centered, yet permit their outward shifting and for proper operation the springs should be of equal strength so as to permit parallel movement of the trucks.

In certain cases it may be found desirable to provide greater bearing area than can be provided by bushings 44 and this may be accomplished by use of slides 72 (Fig. 10). In case the slides are used the slots 22 and 24 must, of course, be elongated to accommodate the slides. While the one rigid tie bar and a resilient centering means has been shown connected to the truck of Figs. 1 to 7, it is to be understood that this structure could likewise be used with the truck frame of Figs. 11 to 13, while the resilient tie bars of the latter figures could be used with the truck structure of Figs. 1 to 7 in place of the rigid tie bar and resilient centering means. Likewise, the slides of Fig. 10 or the bushings of Fig. 9 could be used with either type of truck.

The operation of the structure of Figs. 1 to 9 inclusive is as follows and assuming the trucks to be in the position shown by full lines in Figs. 4 and 5 when on tangent level track. Assuming also that the slots 22 are located adjacent the center of the car and the slots 24 adjacent the ends of the car. When the car enters a curve the wheel flanges will cause the trucks to swing in one direction or the other dependent upon the curve. As viewed in Fig. 7, the curve is in such a direction as to have caused conterclockwise swinging of the trucks on the left end of the car and clockwise swinging on the right end of the car. Since the bolts 40 adjacent the ends of the car and on the outer side of the car can not move inwardly in slots 24, then these bolts become in effect anchors about which the truck swings, with the bushings 44 sliding in slots 22 to the outer ends thereof provided the curve is short. On the trucks adjacent the swing side of the curve the bolts 40 in slots 22 can not move inwardly and the bolts and rollers positioned in slots 24 must swing outwardly. This swinging of one bolt or the other of each truck in their slots 22 or 24 will cause the truck gauge to be shifted as clearly shown in Fig. 9. In this figure the bolts are shown in their normal position with the truck riding on tangent track. When, however, the truck swings so as to move one bolt 40 to the end of slot 22, the truck gauge will have moved a distance, X, that is, in case a car of fourteen foot truck centers is to operate over a minimum curve of eighteen feet, the distance X will need to be approximately one and a half inches. Since this distance or lateral shift of the truck occurs at each side of the car, the increase in truck gauge will for these conditions total three inches. The term truck gauge, as used here and elsewhere may be defined as the distance between the vertical lines formed by the intersection of vertical planes passing through the transverse and longitudinal center lines of each truck. It is to be noted that the truck gauge increases irrespective of the direction of turning of the trucks and always at a rate exactly proportional to the degree of track curvature. In Fig. 7 the car is shown riding the rails R and being pushed around the curve which will, of course, cause the wheels of the trucks riding the outer rails to be forced in tight engagement with the rails. These outer trucks accordingly become the controlling trucks and will through rigid tie bar 50 cause a swinging of the inner trucks. It is to be understood, however, that even if the tie bar 50 was not present or should drop from the car, still the inner trucks would swing due to the engagement between the wheels adjacent the center of the car with the inner rails. Swinging of the trucks by the wheel flanges will cause the truck gauge to increase and as the truck gauge increases the wheels adjacent the ends of the car will separate quite rapidly due to the fact that tie bar 50 connects the inner ends of the truck frames, that is, in the example above, since they are tied together by tie rod 50 and the truck gauge increases three inches, the wheels adjacent the ends of the car will be separated approximately six inches over their normal condition. Such movement of the trucks laterally, together with the rigid tie bar, will cause unequal swinging of the trucks and bring the wheels to the position shown in Fig. 7. It will be seen that the wheels are all well on the rails and there can be no chance of derailment. During the lateral shifting of the trucks due to their swinging the tension structure 46 connecting pins 28 will be stretched in direct proportion to the amount of swinging of the trucks. Since this tension will be applied off center to the bolts 40 which are anchored on the inner ends of slots 24 and 22, the trucks will constantly be pulled toward their normal straight-ahead position. It will be obvious that in the normal position of braking, thrusts or shocks transmitted to the truck in a longitudinal direction will be absorbed by the sides of slots 22 and 24. While any shocks which may be transmitted between the trucks and body in a transverse direction will be transmitted to the inner ends only of the slots, since all such shocks must be transmitted through the wheel flange. It will also be obvious that, due to the converging curvature of slots 22 and 24, even if the tension structures 46 or the resilient tie bars 68 were eliminated, still the trucks would have to return to their normal position, for assuming a bolt 40 to be in the outer end of slot 22, it will be impossible for the bolt riding in slot 24 to move outwardly. Therefore, for one direction of swinging the bolts in slots 24 are the apparent centers for the truck, while in the other direction of swinging from normal, the bolts in slots 22 become the apparent centers.

Referring now to the modified form of Figs. 11 to 13, it will be seen that the trucks swing in accordance with the curve and shift the trucks laterally in accordance with the curve exactly as has been previously described. In this case, however, the resilient tie bars 68 are substituted for the single rigid tie bar 50 and the centering means 46. In case the tension means 70 are of substantially equal strength, then the trucks will remain substantially parallel during their lateral shift and the parts will be brought to the positions shown in Fig. 11 disclosing the car on a comparatively sharp curve. It is obvious that, if desired, the wheels adjacent the ends of the car and riding the inner rails may be brought closer to these rails by making the tension springs 70 adjacent the center of the car slightly stronger than the springs adjacent the outer ends of the car. This will in effect give a position of the inner truck on the rail intermediate the position shown in Fig. 7 and that shown in Fig. 11.

While the increase in truck gauge has been accomplished by use of curved slots, it is obvious that other means for positively shifting the trucks to increase the truck gauge may be used and also it will be obvious that various forms of tie bars, other than those shown, to control the rate of the swinging of the trucks may be used. Accordingly, while the invention has been described with reference to specific illustrations, it is to be understood that various modifications and rearrangements of parts may be made and all such modifications and rearrangements of parts are contemplated as will fall within the scope of the appended claims defining my invention.

What is claimed is:

1. In a car adapted to travel along track having curves therein, the combination with a car body of, body bearing members connected to the car body adjacent each side thereof, laterally spaced apart trucks swingable relative to the car body, and truck bearing members carried by said trucks and engaging said body bearing members to support the car body, said bearing members being so constructed and arranged as to increase the truck gauge during swinging of the trucks on track curves.

2. In a car adapted to travel along track having curves therein, the combination with a car body of, body bearing members connected to the car body adjacent each side thereof, laterally spaced trucks swingable relative to the car body to permit travel of the body around curves in the track, truck bearing members carried by said trucks and engaging said body bearing members to support the car body, and guide means carried by one of said members and cooperating with curved slots in the other of said members to increase the truck gauge during swinging of the trucks on track curves.

3. In a car adapted to travel along track having curves therein, the combination with a car body of, body bearing members connected to the car body adjacent each side thereof, laterally spaced trucks swingable relative to the car body to permit travel of the body around curves in the track, truck bearing members carried by said trucks and engaging said body bearing members to support the car body, guide means carried by one of said members and cooperating with curved slots in the other of said members to increase the truck gauge during swinging of the trucks on track curves, and resilient means connected to the laterally spaced trucks and constantly urging the same toward a position substantially parallel to the longitudinal center line of the car body.

4. In a car adapted to travel along track having curves therein, the combination with a car body of, body bearing members connected to the car body adjacent each side thereof, laterally spaced trucks swingable relative to the car body to permit travel of the body around curves in the track, truck bearing members carried by said trucks and engaging said body bearing members to support the car body, guide means carried by one of said members and cooperating with curved slots in the other of said members to increase the truck gauge during swinging of the trucks on track curves, resilient means connected to the laterally spaced trucks and constantly urging the same toward a position substantially parallel to the longitudinal center line of the car body, and tie bar means connected to the trucks adjacent their inner ends only thereby causing said trucks to swing at different rates when rounding a curve in the track.

5. In a car adapted to travel along track having curves therein, the combination with a car body of, caster trucks supporting the car body adjacent each corner thereof and swingable relative thereto to permit the car to travel around curves in the track, said caster trucks having a normal truck gauge substantially equal to the track gauge, resilient means connected to said caster trucks and tending to hold the same to their normal truck gauge, means carried by said car body and trucks to increase the truck gauge during swinging of the trucks in traveling around curves in the track, and rigid tie bar means connected to the trucks adjacent their inner ends and operating to swing the trucks on the inside of the curve through a greater angle than is swung by the trucks on the outside of the curve.

6. In a car adapted to travel along track having curves therein, the combination with a car body of, caster trucks supporting the car body adjacent each corner thereof and swingable relative thereto to permit the car to travel around curves in the track, said caster trucks having a normal truck gauge substantially equal to the track gauge, means carried by the car body and trucks to increase the truck gauge during swinging of the trucks in traveling around curves in the track, and additional means connected to the trucks and causing the trucks on the inside of the curve to swing at a faster rate than those on the outside of the curve.

7. In a car adapted to travel along track having curves therein, the combination with a car body of, caster trucks supporting the car body adjacent each corner thereof and swingable relative thereto to permit the car to travel around curves in the track, said caster trucks having a normal truck gauge substantially equal to the track gauge, means carried by the car body and trucks to increase the truck gauge during swinging of the trucks in traveling around curves in the track, and additional means connected to the trucks and causing the trucks on the inside of the curve to swing at a faster rate than those on the outside of the curve, said additional means comprising tie bars connected to said caster trucks adjacent their inner and outer ends and including resilient members of different strengths.

8. In a car adapted to travel along track having curves therein, the combination with a car body of, caster trucks supporting the car body adjacent each corner thereof and swingable relative thereto to permit the car to travel around curves in the track, said caster trucks having a normal truck gauge substantially equal to the track gauge, means carried by the car body and trucks to increase the truck gauge during swinging of the trucks in traveling around curves in the track, and additional means connected to the trucks and causing the trucks on the inside of the curve to swing at a faster rate than those on the outside of the curve, said additional means comprising unequal strength resilient tie bars permitting the increase in truck gauge and connected to said caster trucks adjacent the inner and outer ends thereof with the resilient tie bars of lesser strength arranged adjacent the outer ends of the trucks.

9. In a car adapted to travel along track having curves therein, the combination with a car body of, vertically spaced body bearing members connected to the body adjacent each corner thereof and formed with vertically aligned slots, truck bearing members interposed between said body bearing members and movable relative thereto, pairs of vertically extending bolts extending through said truck bearing members and slots and retaining said bearing members in assembled relation, horizontally extending pivot pins extending through said truck bearing members, and caster trucks supporting said pivot pins and rockable relative thereto.

10. In a car adapted to travel along track having curves therein, the combination with a car body of, vertically spaced body bearing members connected to the body adjacent each corner thereof and formed with vertically aligned slots, truck bearing members interposed between said body bearing members and movable relative thereto, pairs of vertically extending bolts extending through said truck bearing members and slots and retaining said bearing members in assembled relation, horizontally extending pivot pins extending through said truck bearing members, and caster trucks supporting said pivot pins and rockable relative thereto, said aligned slots being arranged in vertically aligned pairs curved concentric with the inner end of the adjacent pair whereby one of the bolts of each pair will be held at the inner end of one pair of slots while the other bolt of each pair moves outwardly in the other pair of slots during swinging of the trucks in traveling around track curves.

11. In a car adapted to travel along track having curves therein, the combination with a car body of, vertically spaced body bearing members connected to the body adjacent each corner thereof and formed with vertically aligned slots, truck bearing members interposed between said body bearing members and movable relative thereto, pairs of vertically extending bolts extending through said truck bearing members and slots and retaining said bearing members in assembled relation, horizontally extending pivot pins extending through said truck bearing members, caster trucks supporting said pivot pins and rockable relative thereto, and resilient means connected to said pivot pins and constantly exerting pressure tending to hold said trucks substantially parallel to the longitudinal center line of the car.

ROBERT A. SHIELDS.

REFERENCES CITED

The following references are of record in the file of this patent:

UNITED STATES PATENTS

| Number | Name | Date |
|---|---|---|
| 207,453 | Souther | Aug. 27, 1878 |
| 1,414,955 | Kadel | May 2, 1922 |
| 1,576,298 | Barbey et al. | Mar. 9, 1926 |
| 2,042,623 | Montrose-Oster | June 2, 1936 |
| 2,063,545 | Flowers | Dec. 8, 1936 |
| 2,242,851 | Flowers | May 20, 1941 |